(12) United States Patent
Wu

(10) Patent No.: US 12,510,218 B1
(45) Date of Patent: Dec. 30, 2025

(54) VEHICLE LIGHT DEVICE INCLUDING FIRST LIGHT EMITTER UNIT AND SECOND LIGHT EMITTER UNIT

(71) Applicant: COPLUS INC., Tainan (TW)

(72) Inventor: Po-Hua Wu, Tainan (TW)

(73) Assignee: COPLUS INC., Tainan (TW)

( * ) Notice: Subject to any disclaimer, the term of this patent is extended or adjusted under 35 U.S.C. 154(b) by 0 days.

(21) Appl. No.: 18/999,023

(22) Filed: Dec. 23, 2024

(30) Foreign Application Priority Data

Aug. 16, 2024 (TW) .................................. 113130993

(51) Int. Cl.
  *F21S 41/125* (2018.01)
  *B60Q 1/04* (2006.01)
  *F21S 41/19* (2018.01)
  *F21S 41/25* (2018.01)
  *F21W 107/10* (2018.01)

(52) U.S. Cl.
  CPC .......... *F21S 41/125* (2018.01); *B60Q 1/0408* (2013.01); *F21S 41/192* (2018.01); *F21S 41/25* (2018.01); *F21W 2107/10* (2018.01)

(58) Field of Classification Search
  CPC ...... B60Q 1/0408; F21S 41/25; F21S 41/125; F21S 41/192; F21W 2107/10
  See application file for complete search history.

(56) References Cited

U.S. PATENT DOCUMENTS

| | | | | |
|---|---|---|---|---|
| 10,309,606 | B2* | 6/2019 | Takada | F21S 41/192 |
| 2005/0157508 | A1* | 7/2005 | Takada | F21S 41/25 |
| | | | | 362/459 |
| 2021/0010653 | A1* | 1/2021 | Hermitte | F21S 41/25 |
| 2022/0349544 | A1* | 11/2022 | Yamamoto | F21S 41/125 |

* cited by examiner

*Primary Examiner* — Keith G. Delahoussaye
(74) *Attorney, Agent, or Firm* — Muncy, Geissler, Olds & Lowe, P.C.

(57) ABSTRACT

A vehicle light device includes a light seat module, a first light emitter unit, a first lens having a first curved surface, a second light emitter unit, and a second lens having a second curved surface that has a shape being a vertically inverted shape of the first curved surface. The first light emitter unit and the second light emitter unit are operable for emitting first colored light and second colored light. The first light emitter unit and the second light emitter unit are operable to simultaneously emit the first colored light through the first lens and the second lens, respectively, to form a first colored light beam. The first light emitter unit and the second emitter unit are operable to simultaneously emit the second colored light through the first lens and the second lens, respectively, to form a second colored light beam.

9 Claims, 5 Drawing Sheets

VEHICLE LIGHT DEVICE INCLUDING FIRST LIGHT EMITTER UNIT AND SECOND LIGHT EMITTER UNIT

CROSS-REFERENCE TO RELATED APPLICATION

This application claims priority to Taiwanese Invention Patent Application No. 113130993, filed on Aug. 16, 2024, the entire disclosure of which is incorporated by reference herein.

FIELD

The disclosure relates to a vehicle light device, and more particularly to a vehicle light device for a utility task vehicle (UTV).

BACKGROUND

A conventional vehicle light includes a light emitter device, and a lens that is disposed in front of and covers the light emitter device. A beam pattern of the conventional vehicle light is restricted by vehicular regulations; in other words, an illuminated area, luminance, and color of the conventional vehicle light must adhere to the vehicular regulations. The lens of the conventional vehicle light adjusts the beam pattern of the light emitted from the light emitter device into a beam pattern that adheres to the vehicular regulations.

However, a conventional UTV is exempted from the abovementioned related regulations. Hence, vehicle lights for UTVs have more room for variety compared to vehicle lights for conventional vehicles.

A conventional UTV has two conventional UTV lights respectively disposed on left and right sides thereof, and each of the conventional UTV lights is operable for emitting white light. However, the configuration of the conventional UTV lights is unable to meet different driving needs in different scenarios, and thus an auxiliary light is required for a wider illuminated area, greater luminance, or more variety in light colors.

Furthermore, to design a new UTV light that has both the effects of the conventional UTV light and the auxiliary light, extra customized components are required, making assembly of the new UTV light complicated. Hence, how to improve the conventional UTV light using the light emitter device and the lens of the conventional vehicle light is a problem that vehicle light manufacturers have been trying to solve.

SUMMARY

Therefore, an object of the disclosure is to provide a vehicle light device that can alleviate at least one of the drawbacks of the prior art.

According to the disclosure, the vehicle light device is adapted to be mounted to a utility task vehicle (UTV). The vehicle light device includes a light seat module, a first vehicle light module, and a second vehicle light module. The light seat module includes a light seat adapted to be fixed to a front area of the UTV. The first vehicle light module is mounted to the light seat, and includes a first light emitter unit and a first lens. The first light emitter unit is operable for emitting first colored light and second colored light, and includes at least one first upper light emitter member that is for emitting the first colored light, and at least one first lower light emitter member that is disposed below the at least one first upper light emitter member for emitting the second colored light. The first lens is disposed in front of the first light emitter unit in a frontward direction, and has a first curved surface that is disposed for directing forwardly the first colored light and the second colored light emitted from the first light emitter unit. The second vehicle light module is mounted to the light seat, is disposed below the first vehicle light module, and includes a second light emitter unit and a second lens. The second light emitter unit is operable for emitting the first colored light and the second colored light, and includes at least one second upper light emitter member that is for emitting the second colored light, and at least one second lower light emitter member that is disposed below the at least one second upper light emitter member for emitting the first colored light. The second lens is disposed in front of the second light emitter unit in the frontward direction, and has a second curved surface that is disposed for directing forwardly the first colored light and the second colored light emitted from the second light emitter unit. A shape of the second curved surface is a vertically inverted shape of the first curved surface. The at least one first upper light emitter member and the at least one second lower light emitter member are operable to simultaneously emit the first colored light through the first lens and the second lens, respectively, to thereby form a first colored light beam. The at least one first lower light emitter member and the at least one second upper light emitter member are operable to simultaneously emit the second colored light through the first lens and the second lens, respectively, to thereby form a second colored light beam. The first colored light beam and the second colored light beam have substantially identical casting positions and beam patterns.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
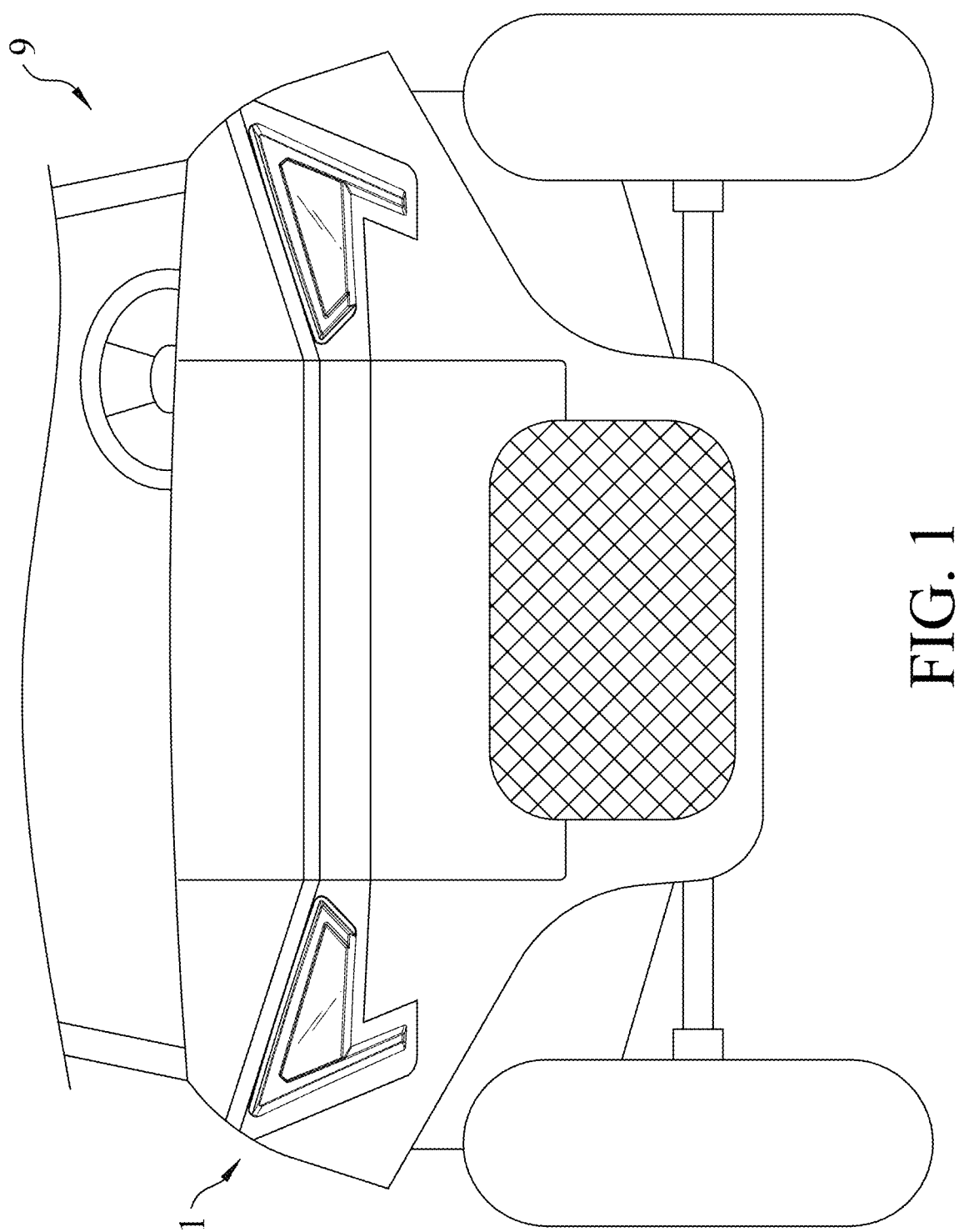
FIG. 1 is a fragmentary front view illustrating an embodiment of a vehicle light device according to the disclosure mounted to a utility task vehicle (UTV).

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIG. 1, an embodiment of a vehicle light device 1 according to the disclosure is adapted to be mounted to a front right area of a utility task vehicle (UTV) 9. Aside from the vehicle light device 1, the UTV 9 includes another vehicle light device that is mounted to a front left area of the UTV 9. A structure of the another vehicle light device is a horizontally mirrored structure of the vehicle light device 1. For the sake of brevity, only the vehicle light device 1 disposed at the front right area will be described in the following.

Figure 2:
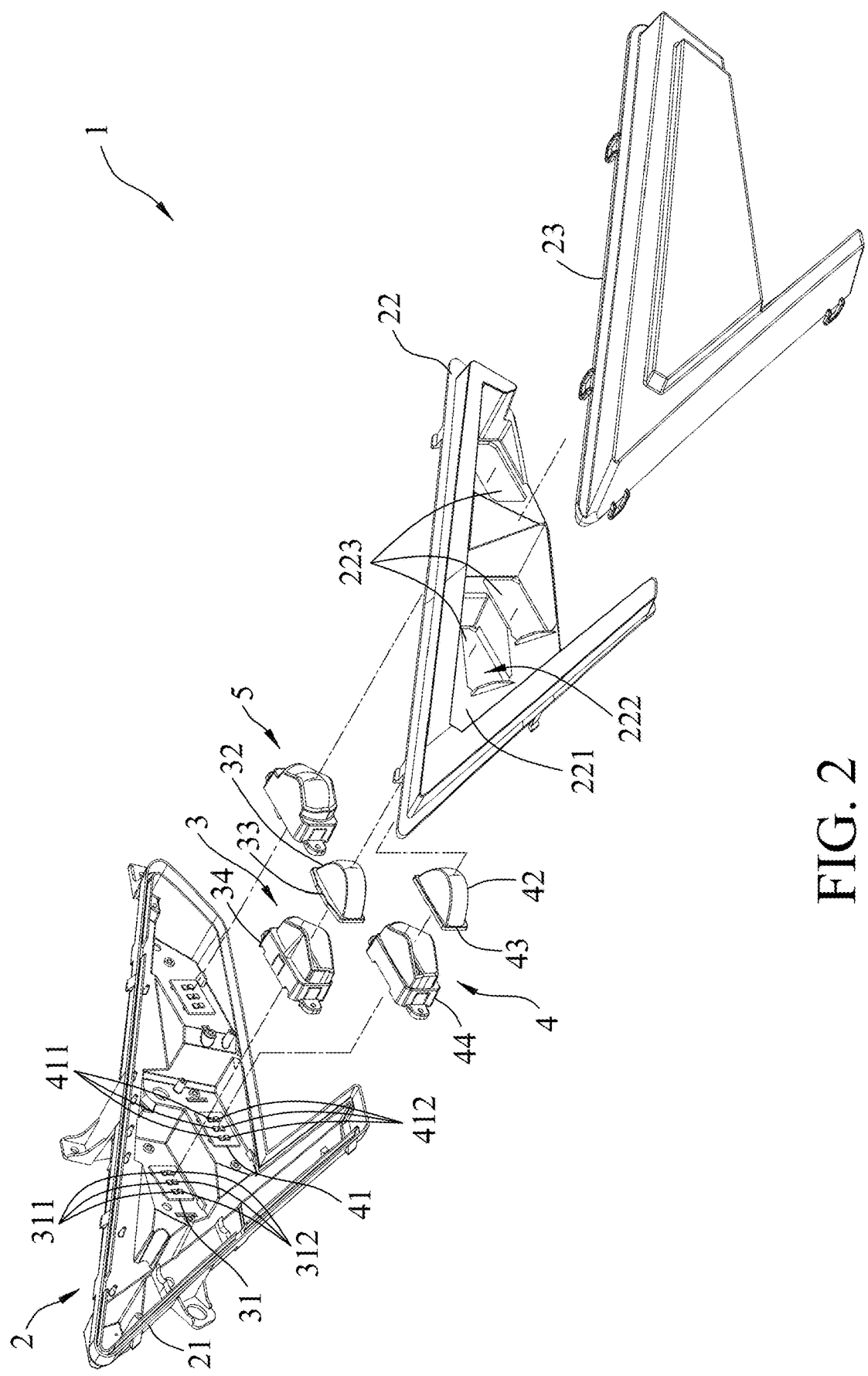
FIG. 2 is a partially exploded perspective view of the embodiment.
Figure 3:
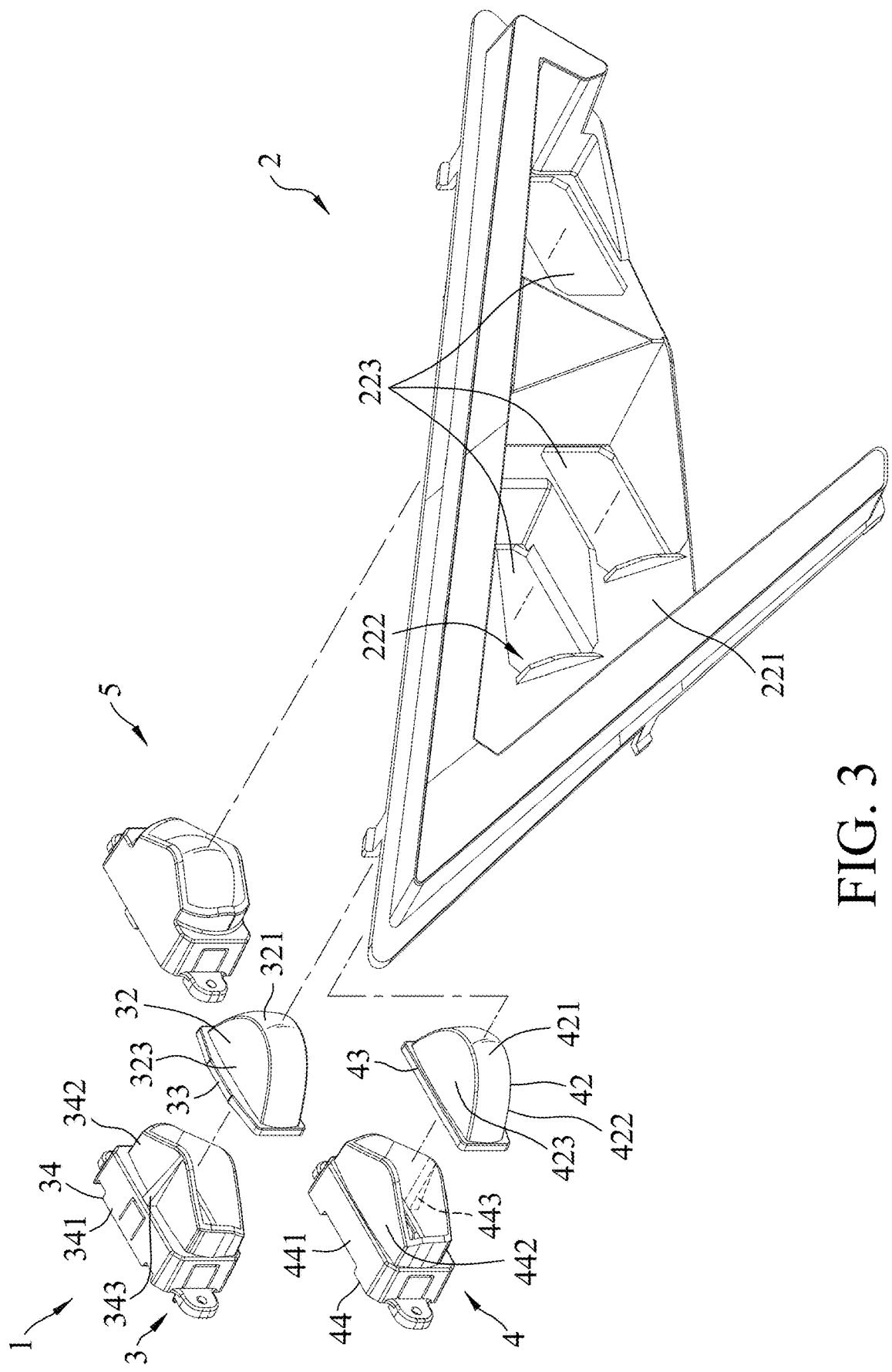
FIG. 3 is an exploded perspective view of the embodiment.
Figure 5:
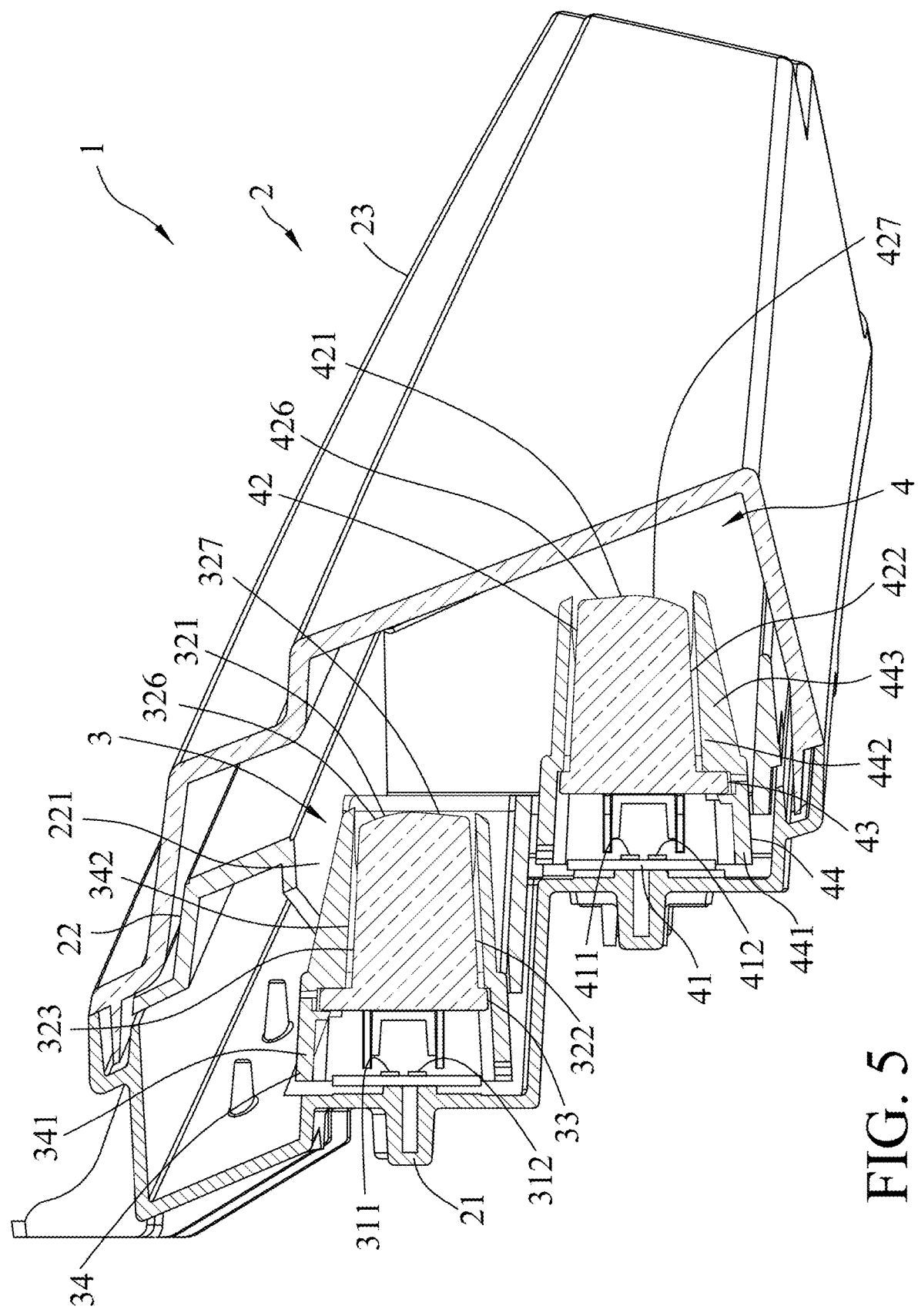
FIG. 5 is an offset sectional view of the embodiment taken along line V-V in FIG. 4.

Referring to FIGS. 2, 3 and 5, the vehicle light device 1 includes a light seat module 2, a first vehicle light module 3 that is mounted to the light seat module 2, a second vehicle light module 4 that is mounted to the light seat module 2 and that is disposed below the first vehicle light module 3, and a third vehicle light module 5 that is mounted to the light seat module 2 and that is disposed on the left of the second vehicle light module 4.

The light seat module 2 includes a light seat 21 adapted to be fixed to a front area of the UTV 9 (specifically, the front right area of the UTV 9), a light cover 23 mounted to the light seat 21 and facing frontward, and a fixture 22 mounted between the light seat 21 and the light cover 23. The first vehicle light module 3, the second vehicle light module 4, and third vehicle light module 5 are mounted to the light seat 21. Specifically, the fixture 22 has a limiting portion 221 that positions the first vehicle light module 3, the second vehicle light module 4, and the third vehicle light module 5. The limiting portion 221 is formed with a hole unit 222 that has three through holes 223, and the first vehicle light module 3, the second vehicle light module 4, and the third vehicle light module 5 respectively extend through and are exposed from the through holes 223. It should be noted that, a number of the through holes 223 is not limited to the disclosure; in another embodiment where the number of the through holes 223 may be one, the first vehicle light module 3, the second vehicle light module 4, and the third vehicle light module 5 may extend through and be exposed from the through hole 223 of the hole unit 222.

The first vehicle light module 3 includes a first light emitter unit 31 operable for emitting first colored light and second colored light, a first lens 32 disposed in front of the first light emitter unit 31 in a frontward direction, a first installation body 33 connected to a rear side of the first lens 32, and a first fixer body 34 being ring-shaped, sleeved on the first lens 32, and mounted to the light seat 21. Specifically, the first fixer body 34 has a first fixer portion 341 mounted to the light seat 21, a first extension portion 342 extending frontwardly from the first fixer portion 341, and a first indication portion 343 formed on the first extension portion 342, facing upward and for indicating an orientation of the first fixer body 34. The first installation body 33 has asymmetrical top and bottom sides. In this embodiment, the top side of the first installation body 33 protrudes upwardly, and the bottom side of the first installation body 33 is flat. The first fixer portion 341 has an inner structure that is engaged with and adhered to the top and bottom sides of first installation body 33. A shape of the inner structure of the first fixer portion 341 and a shape of the first installation body 33 are complementary. In an assembly process of the first vehicle light module 3, the first installation body 33 is coupled with the first fixer body 34, and while the first indication portion 343 is facing upward, the first vehicle light module 3 is mounted to the light seat 21. Hence, the first indication portion 343 prevents the first vehicle light module 3 from being mounted to the light seat 21 at a wrong orientation.

The first light emitter unit 31 includes at least one first upper light emitter member 311 for emitting the first colored light, and at least one first lower light emitter member 312 disposed below the at least one first upper light emitter member 311 for emitting the second colored light. In this embodiment, the at least one first upper light emitter member 311 includes three first upper light emitter members 311, and the at least one first lower light emitter member 312 includes three first lower light emitter members 312. In this embodiment, a color of the first colored light is white, and a color of the second colored light is yellow. It should be noted that, in other embodiments, the colors of the first colored light and the second colored light may be other colors. In other embodiments, a number of the first upper light emitter members 311 and a number of the first lower light emitter members 312 each may be one or greater than three.

The first lens 32 has a first curved surface 321, a first bottom surface 322 extending rearwardly from a bottom end of the first curved surface 321, and a first top surface 323 extending rearwardly from a top end of the first curved surface 321. A length of the first bottom surface 322 in the frontward direction is greater than a length of the first top surface 323 in the frontward direction. The first bottom surface 322 and the first top surface 323 are connected to the first installation body 33. The first curved surface 321 is disposed for directing forwardly the first and second colored light emitted from the first light emitter unit 31.

The second vehicle light module 4 includes a second light emitter unit 41 operable for emitting the first colored light and the second colored light, a second lens 42 disposed in front of the second light emitter unit 41 in the frontward direction, a second installation body 43 connected to a rear side of the second lens 42 and mounted to the light seat 21, and a second fixer body 44 being ring-shaped, sleeved on the second lens 42, and mounted to the light seat 21. The second installation body 43 has top and bottom sides. A structure of the second installation body 43 is a vertically inverted structure of the first installation body 33. A structure of the second fixer body 44 is a vertically inverted structure of the first fixer body 34. The second fixer body 44 has a second fixer portion 441 mounted to the light seat 21, a second extension portion 442 extending frontwardly from the second fixer portion 441, and a second indication portion 443 formed on the second extension portion 442, facing downward and for indicating an orientation of the second fixer body 44. A structure of the second indication portion 443 is a vertically inverted structure of the first indication portion 343.

The second fixer portion 441 has an inner structure that is engaged with and adhered to the top and bottom sides of second installation body 43. In this embodiment, the top side of the second installation body 43 is flat, and the bottom side of the second installation body 43 protrudes downwardly. A shape of the inner structure of the second fixer portion 441 and a shape of the second installation body 43 are complementary. In an assembly process of mounting the second vehicle light module 4 to the light seat 21, the second installation body 43 is coupled to the second fixer portion 441, and while the second indication portion 443 is facing downward, the second vehicle light module 4 is mounted to the light seat 21. Hence, the second indication portion 443 prevents the second vehicle light module 4 from being mounted to the light seat 21 at a wrong orientation.

The second light emitter unit 41 includes at least one second upper light emitter member 411 for emitting the second colored light, and at least one second lower light emitter member 412 disposed below the at least one second upper light emitter member 411 for emitting the first colored light.

The second lens 42 has a second curved surface 421, a second bottom surface 422 extending rearwardly from a bottom end of the second curved surface 421, and a second top surface 423 extending rearwardly from a top end of the second curved surface 421. A size of the second bottom surface 422 is the same as a size of the first top surface 323. A size of the second top surface 423 is the same as a size of the first bottom surface 322. A shape of the second curved surface 421 is a vertically inverted shape of the first curved surface 321. The second curved surface 421 is disposed for directing forwardly the first and second colored light emitted from the second light emitter unit 41.

Figure 4:
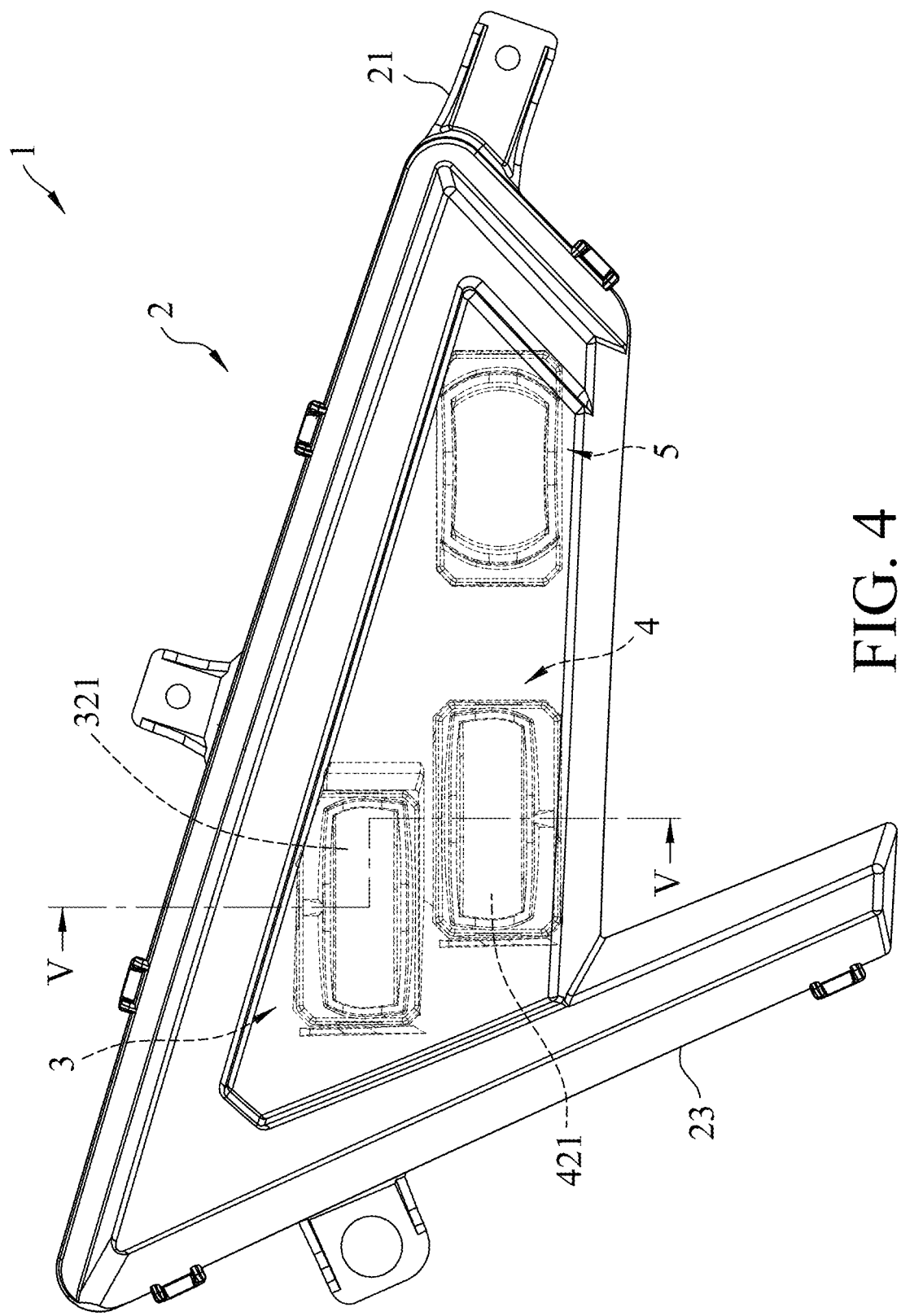
FIG. 4 is a front view of the embodiment.

Referring to FIGS. 4 and 5, the first curved surface 321 has a first curved segment 326 and a first straight segment 327 disposed below the first curved segment 326. The second curved surface 421 has a second curved segment 427 and a second straight segment 426 disposed above the second curved segment 427. The first straight segment 327 and the second straight segment 426 are proximate to each other.

It should be noted that, in this embodiment, the first vehicle light module 3 is the aforementioned conventional vehicle light. The first lens 32 controls a beam pattern, and an illuminated area of light emitted from the first light emitter unit 31, and since the first vehicle light module 3 is a conventional vehicle light, the beam pattern adheres to the aforementioned vehicular regulations.

The second vehicle light module 4 is a conventional vehicle light that is identical to the first vehicle light module 3 but is vertically inverted. By virtue of the configurations of the first vehicle light module 3 and the second vehicle light module 4, an illuminated area of the vehicle light device 1 is bigger than an illuminated area of the conventional vehicle light.

In other embodiments, the third vehicle light module 5 may have a structure identical to one of a structure of the first vehicle light module 3 and a structure of the second vehicle light module 4.

In an assembly process of the vehicle light device 1, in order to prevent the situation where the first vehicle light module 3 is mounted to the light seat 21 at incorrect orientations, by virtue of the configurations of the first installation body 33 and the first fixer body 34, the first lens 32 may be at a correct orientation in order to be assembled to the first fixer body 34, and since the first indication portion 343 indicates the orientation of the first fixer body 34, the first vehicle light module 3 is prevented from being mounted to the light seat 21 at a wrong orientation. Similarly, in order to prevent the situation where the second vehicle light module 4 is mounted to the light seat 21 at incorrect orientations, by virtue of the configurations of the second installation body 43 and the second fixer body 44, the second lens 42 may be at a correct orientation in order to be assembled to the second fixer body 44, and since the second indication portion 443 indicates the orientation of the second fixer body 44, the second vehicle light module 4 is prevented from being mounted to the light seat 21 at a wrong orientation.

The first upper light emitter members 311 and the second lower light emitter members 412 are operable to simultaneously emit the first colored light through the first lens 32 and the second lens 42, respectively, to thereby form a first colored light beam. In driving situations where illumination is needed (e.g., a driver drives at night), the first colored light beam is used.

The first lower light emitter members 312 and the second upper light emitter members 411 are operable to simultaneously emit the second colored light through the first lens 32 and the second lens 42, respectively, to thereby form a second colored light beam. The second colored light beam has better penetration than the first colored light beam, so that in driving situations where the driver drives in a rainy or foggy day, the second colored light beam is used. The first colored light beam and the second colored light beam have substantially identical casting positions and beam patterns. The third vehicle light module 5 is operable for providing extra light.

It should be noted that, in other embodiments, the vehicle light device 1 may simultaneously emit the first colored light beam and the second colored light beam to form a combination thereof.

In conclusion, since the first vehicle light module 3 and the second vehicle light module 4 are conventional vehicle lights, the vehicle light device 1 is operable for emitting one of the first colored light beam and the second colored light beam. Since the vehicle light device 1 includes multiple conventional vehicle lights (i.e., the first vehicle light module 3, the second vehicle light module 4, and the third vehicle light device 5), the vehicle light device 1 has a greater illuminated area compared to the conventional vehicle light.

Since the first vehicle light module 3 and the second vehicle light module 4 are vertically inverted, and since the first colored light beam and the second colored light beam have substantially identical casting positions and beam patterns, the illuminated areas remain substantially at the same vertical height when the vehicle light device 1 switches from the first colored light beam to the second colored light beam, which prevents discrepancy between the vertical heights of the illuminated areas of the first colored light beam and the second colored light beam.

Since the first installation body 33 has to be at a correct orientation for being assembled to the first fixer body 34, the second installation body 43 has to be at a correct orientation for being assembled to the second fixer body 44, and the first indication portion 343 and the second indication portion 443 respectively indicate the orientations of the first fixer body 34 and the second fixer body 44, situations where any one of the first vehicle light module 3 and the second vehicle light module 4 is mounted to the light seat 21 at a wrong orientation are prevented.

Moreover, the structure of the vehicle light device 1 is simple and prevents errors during assembly of the vehicle light device 1, and since the first vehicle light module 3 and the second vehicle light module 4 are conventional vehicle lights, there is no need to develop the aforementioned new UTV light for achieving brighter luminance, a greater illuminated area, and more variety in light colors. Hence, the objective of the disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A vehicle light device adapted to be mounted to a utility task vehicle (UTV), said vehicle light device comprising:
    a light seat module that includes a light seat adapted to be fixed to a front area of the UTV;
    a first vehicle light module that is mounted to said light seat, and that includes
        a first light emitter unit operable for emitting first colored light and second colored light, and including
            at least one first upper light emitter member for emitting the first colored light, and
            at least one first lower light emitter member disposed below said at least one first upper light emitter member for emitting the second colored light, and
        a first lens disposed in front of said first light emitter unit in a frontward direction, and having a first curved surface that is disposed for directing forwardly the first colored light and the second colored light emitted from said first light emitter unit; and
    a second vehicle light module that is mounted to said light seat, that is disposed below said first vehicle light module, and that includes
        a second light emitter unit operable for emitting the first colored light and the second colored light, and including
            at least one second upper light emitter member for emitting the second colored light, and
            at least one second lower light emitter member disposed below said at least one second upper light emitter member for emitting the first colored light, and
        a second lens disposed in front of said second light emitter unit in the frontward direction, and having a second curved surface that is disposed for directing forwardly the first colored light and the second colored light emitted from said second light emitter unit, a shape of said second curved surface being a vertically inverted shape of said first curved surface;
    wherein, said at least one first upper light emitter member and said at least one second lower light emitter member are operable to simultaneously emit the first colored light through said first lens and said second lens, respectively, to thereby form a first colored light beam; and
    wherein, said at least one first lower light emitter member and said at least one second upper light emitter member are operable to simultaneously emit the second colored light through said first lens and said second lens, respectively, to thereby form a second colored light beam, the first colored light beam and the second colored light beam having substantially identical casting positions and beam patterns.

2. The vehicle light device as claimed in claim 1, wherein:
    said first curved surface has a first curved segment and a first straight segment disposed below said first curved segment; and
    said second curved surface has a second curved segment and a second straight segment disposed above said second curved segment.

3. The vehicle light device as claimed in claim 1, wherein:
    said first lens further has a first bottom surface extending rearwardly from a bottom end of said first curved surface, and a first top surface extending rearwardly from a top end of said first curved surface; and
    said second lens further has a second bottom surface extending rearwardly from a bottom end of said second curved surface, and a second top surface extending rearwardly from a top end of said second curved surface, a size of said second bottom surface being same as a size of said first top surface, a size of said second top surface being same as a size of said first bottom surface.

4. The vehicle light device as claimed in claim 3, wherein a length of said first bottom surface in the frontward direction is greater than a length of said first top surface in the frontward direction.

5. The vehicle light device as claimed in claim 3, wherein:
    said first vehicle light module further includes
        a first installation body connected to a rear side of said first lens and having a top side and a bottom side that are asymmetrical, and
        a first fixer body being ring-shaped, sleeved on said first lens, and having an inner structure that is engaged with said top side and said bottom side of said first installation body; and
    said second vehicle light module further includes
        a second installation body connected to a rear side of said second lens and having a top side and a bottom side, a structure of said second installation body being a vertically inverted structure of said first installation body, and
        a second fixer body being ring-shaped, sleeved on said second lens, and having an inner structure that is engaged with said top side and said bottom side of said second installation body.

6. The vehicle light device as claimed in claim 5, wherein:
    said first fixer body has a first indication portion facing upward and for indicating an orientation of said first fixer body; and
    said second fixer body has a second indication portion facing downward and for indicating an orientation of said second fixer body.

7. The vehicle light device as claimed in claim 1, wherein said light seat module further includes a light cover mounted to said light seat and facing frontward.

8. The vehicle light device as claimed in claim 7, wherein:
    said light seat module further includes a fixture mounted between said light seat and said light cover, said fixture having a limiting portion that positions said first vehicle light module and said second vehicle light module; and
    said limiting portion is formed with a hole unit, said first vehicle light module and said second vehicle light module extending through and being exposed from said hole unit.

9. The vehicle light device as claimed in claim 8, further comprising a third vehicle light module, said third vehicle light module extending through, being exposed from said hole unit, and being positioned by said limiting portion.

* * * * *